(12) United States Patent
Johansen

(10) Patent No.: US 9,339,844 B2
(45) Date of Patent: *May 17, 2016

(54) METHOD FOR THE PREPARATION OF A CATALYSED PARTICULATE FILTER AND CATALYSED PARTICULATE FILTER

(75) Inventor: Keld Johansen, Frederikssund (DK)

(73) Assignee: Haldor Topsoe A/S, Lyngby (DK)

( * ) Notice: Subject to any disclaimer, the term of this patent is extended or adjusted under 35 U.S.C. 154(b) by 504 days.

This patent is subject to a terminal disclaimer.

(21) Appl. No.: 13/881,787

(22) PCT Filed: Jul. 1, 2011

(86) PCT No.: PCT/EP2011/003258
§ 371 (c)(1),
(2), (4) Date: Apr. 26, 2013

(87) PCT Pub. No.: WO2012/059145
PCT Pub. Date: May 10, 2012

(65) Prior Publication Data
US 2013/0216439 A1    Aug. 22, 2013

(30) Foreign Application Priority Data

Nov. 2, 2010   (DK) .................. 2010 00991
Dec. 9, 2010   (DK) .................. 2010 01111

(51) Int. Cl.
| | |
|---|---|
| *B01J 21/00* | (2006.01) |
| *B01J 23/00* | (2006.01) |
| *B01J 25/00* | (2006.01) |
| *B01J 27/00* | (2006.01) |
| *B01J 29/00* | (2006.01) |
| *B01J 29/04* | (2006.01) |
| *B01J 29/87* | (2006.01) |
| *B05D 3/02* | (2006.01) |
| *B01J 23/44* | (2006.01) |
| *B01J 29/76* | (2006.01) |
| *B01J 29/85* | (2006.01) |
| *B01J 35/00* | (2006.01) |
| *B01J 35/02* | (2006.01) |
| *B01J 37/00* | (2006.01) |
| *B01J 37/02* | (2006.01) |
| *B01J 37/03* | (2006.01) |
| *B01J 37/04* | (2006.01) |
| *B01J 23/72* | (2006.01) |
| *B01J 35/04* | (2006.01) |
| *C04B 35/10* | (2006.01) |
| *C04B 35/185* | (2006.01) |
| *C04B 35/478* | (2006.01) |
| *C04B 35/565* | (2006.01) |
| *C04B 38/00* | (2006.01) |
| *C04B 111/00* | (2006.01) |

(52) U.S. Cl.
CPC .............. *B05D 3/0254* (2013.01); *B01J 23/44* (2013.01); *B01J 23/72* (2013.01); *B01J 29/7615* (2013.01); *B01J 29/85* (2013.01); *B01J 35/0006* (2013.01); *B01J 35/023* (2013.01); *B01J 35/04* (2013.01); *B01J 37/0036* (2013.01); *B01J 37/0244* (2013.01); *B01J 37/0246* (2013.01); *B01J 37/0248* (2013.01); *B01J 37/038* (2013.01); *B01J 37/04* (2013.01); *C04B 35/10* (2013.01); *C04B 35/185* (2013.01); *C04B 35/478* (2013.01); *C04B 35/565* (2013.01); *C04B 38/0006* (2013.01); *C04B 2111/0081* (2013.01); *C04B 2111/00793* (2013.01)

(58) Field of Classification Search
USPC .................................. 502/100, 60, 208, 300
See application file for complete search history.

(56) References Cited

U.S. PATENT DOCUMENTS

| | | | | |
|---|---|---|---|---|
| 9,073,047 | B2 * | 7/2015 | Johansen | B01D 53/9418 |
| 2008/0256936 | A1 | 10/2008 | Zuberi | |
| 2009/0196812 | A1 | 8/2009 | Bull et al. | |
| 2010/0058746 | A1 | 3/2010 | Pfeifer et al. | |
| 2010/0175372 | A1 | 7/2010 | Lambert et al. | |
| 2011/0229391 | A1 | 9/2011 | Paulus et al. | |
| 2011/0252773 | A1 * | 10/2011 | Arnold | B01D 46/2429 60/297 |

FOREIGN PATENT DOCUMENTS

| | | |
|---|---|---|
| CN | 101091916 A | 12/2007 |
| CN | 101711185 A | 5/2010 |
| JP | H09-173866 A | 7/1997 |
| JP | 2010-519020 A | 6/2010 |
| JP | 2010-519039 A | 6/2010 |
| JP | 2011-510899 A | 4/2011 |
| RU | 2059841 C1 | 5/1996 |
| WO | WO 2008/106523 A2 | 9/2008 |
| WO | WO 2010/051983 A1 | 5/2010 |

* cited by examiner

*Primary Examiner* — James McDonough
(74) *Attorney, Agent, or Firm* — Blank Rome LLP

(57) ABSTRACT

Method for the preparation of a catalysed particulate filter and a particulate filter prepared by the method.

9 Claims, No Drawings

METHOD FOR THE PREPARATION OF A CATALYSED PARTICULATE FILTER AND CATALYSED PARTICULATE FILTER

The present invention relates to multifunctional catalysed diesel particulate filters. In particular, the invention relates to a method for the preparation of catalysed particulate filters having both an activity in the removal of nitrogen oxides by the known selective catalytic reduction (SCR) process, and oxidation activity for the oxidative conversion of hydrocarbons and carbon monoxide contained in the exhaust gas into water and carbon dioxide and the conversion of excess of ammonia used as reductant in the SCR into nitrogen.

The invention provides furthermore a catalysed particle filter catalysed with an SCR catalyst in its inlet/dispersion side and filter walls, and with an ammonia slip catalyst together with an oxidation catalyst in the outlet/permeation side of the filter.

In addition to unburnt hydrocarbons, diesel exhaust contains nitrogen oxides (NOx) and particulate matter. NOx, hydrocarbons and particulate matter are materials and chemical compounds representing a health and environmental risk and must be reduced or removed from the engine exhaust gas by passing the exhaust through a particle filter and several catalyst units.

Typically, these filters are honeycomb wall flow filters, wherein the particulate matter is captured on or in partition walls of the honeycomb filter.

In addition to a particulate filter, exhaust gas cleaning systems disclosed in the art comprise beside a catalyst unit being active in the selective reduction of NOx by reaction with ammonia to nitrogen and a diesel oxidation catalyst.

In order to remove excess of ammonia injected into the exhaust gas for use in the SCR, a number of the known exhaust gas cleaning systems comprise additionally a downstream catalyst unit catalysing the conversion of ammonia into nitrogen, the so-called ammonia slip catalyst.

Multifunctional diesel particulate filters coated with catalysts catalysing the above mentioned reactions are also known in the art.

In the known multifunctional filters the different catalysts are segmentarily or zone coated in different zones of the filter.

Segmentary or zone coating of different catalysts on the filter is an expensive and difficult preparation process.

U.S. 2010/0175372 discloses in one embodiment a diesel exhaust gas treatment system with a filter catalysed with an SCR catalyst on the dispersion side of the filter, and with an ammonia oxidation catalyst and diesel oxidation catalyst on the permeation side. The SCR catalyst is washcoated on the entire filter substrate followed by application of the ammonia oxidation catalyst at the outlet filter channels. The diesel oxidation catalyst is applied as an overlayer on the ammonia oxidation catalyst at the outlet channels.

Compared to known technique, the present invention suggests an easier method for the preparation of particulate filters catalysed with different catalysts for the selective reduction of nitrogen oxides with ammonia and removal of hydrocarbons, carbon monoxide and excess ammonia.

Accordingly, the invention provides a Method for the preparation of a catalysed particulate filter comprising the steps of a) providing a porous filter body having a dispersion side and a permeation side;
b) providing a catalyst washcoat containing particles of a first catalyst composition being active in selective catalytic reduction of nitrogen oxides together with particles of second catalyst composition being active in oxidation of carbon monoxide, hydrocarbons and ammonia and particles of a third catalyst composition being active in selective oxidation of ammonia to nitrogen in combination with the second catalyst composition, wherein the particles of the first catalyst composition have a mode particle size less than mean pore size of the particulate filter, and wherein the particles of the second and third catalyst composition have a mode particle size larger than mean pore size of the particulate filter;
c) coating the filter body with the catalyst washcoat by introduction of the washcoat into outlet end of the permeation side; and
d) drying and heat treating the coated filter body to obtain the catalysed particulate filter.

The term "inlet end" used hereinbefore and in the following description means the end of the filter and the channels being contacted by unfiltered gas and "outlet end" means the end of the filter and the channels where the filtered gas leaves the filter body.

The terms "dispersion side" and "permeate side" as used herein refer to flow passages of the filter facing the particulate containing exhaust gas and to flow passages facing the filtered exhaust gas, respectively.

The main advantage of the method according to the invention is that the filter can be coated with a single washcoat containing three types of catalyst formulation catalysing different reaction. When introducing the washcoat into outlet end of the permeation side, the SCR catalyst particles will diffuse into the porous filter wall and to the dispersion side, while the hydrocarbon/carbon monoxide oxidation catalyst and the ammonia oxidation catalyst particles are retained outside the pores of the partition walls in the filter permeation side. Thereby the preparation of a multifunctional catalysed filter has been much improved in terms of an easier and cheaper production setup.

A further advantage of coating a filter with different types of catalysts in form of a mixture of catalyst particles is found in an improved heat transfer and warm up during cold start. As a result it is possible to start injection of a reductant and the SCR NOx reaction removal earlier after start than hitherto known.

According to one embodiment of the invention, the first catalyst particles in the washcoat active in the selective catalytic reduction of NOx comprise at least one of a zeolite, a silica aluminum phosphate, an ion exchanged zeolite or a silica aluminum phosphate promoted with iron and/or copper, one or more base metal oxides and a catalyst support of at least one of cerium oxide mixed with tungsten oxide on a titania support, an alumina support, a zirconia support or silica support.

Preferred zeolites for use in the invention are beta zeolite or a chabazite zeolite.

A preferred silica alumina phosphate with chabazite structure for use in the invention is SAPO 34 promoted with copper.

According to yet another embodiment of the invention, the second catalyst composition being active in oxidation of hydrocarbons, carbon monoxide and ammonia comprises a mixture of platinum and palladium supported on at least one of alumina, titania, ceria, silica and zirconia.

In further an embodiment of the invention, the third catalyst composition being active in the selective oxidation of ammonia to nitrogen comprises a copper and/or iron promoted zeolite or a copper and/or iron promoted silica alumina phosphate with chabazite structure, preferably the promoted zeolite is a beta zeolite or a chabazite zeolite.

In order to form the washcoat for use in the invention, the first, second and third catalyst composition, usually in particle form are milled or agglomerated to the required particle size and suspended in water or organic solvents, optionally with addition of binders, viscosity improvers, foaming agents or other processing aids.

The washcoat may be prepared by suspending the first, second and third catalyst particles as a single suspension or by preparing three different suspensions, viz. a first with the SCR catalyst particles, a second with the hydrocarbon/carbon monoxide/ammonia oxidation catalyst particles, and a third with the selective ammonia oxidation catalyst particles, and mixing the three suspension in a volume ratio to prepare the washcoat with the required amount of the first, second and third catalyst particles.

As already mentioned above, in order to allow the SCR catalyst particles to diffuse effectively into the partition walls during washcoating of the filter and to prevent the oxidation catalyst compositions from diffusing from the permeation side to the dispersion side, the SCR catalyst has an average particle size smaller than the mean pore diameter of the filter, and the ammonia and hydrocarbon/carbon monoxide oxidation catalyst compositions have an average particle size larger than the mean pore diameter.

According to a preferred embodiment of the invention, the filter is in form of a wall flow monolith with a plurality of longitudinal passages divided by longitudinal porous walls, dispersion side of the passages having an open inlet end and an outlet end being plugged with plugs, and permeation side of the passages having an inlet end being plugged with plugs and an open outlet end.

The filter body is washcoated according to common practice including applying vacuum suction through the filter, pressurizing the washcoat or by dip coating.

When using the vacuum washcoat process, the vacuum is created on the inlet end of the dispersion side.

When using the dip coating process, the filter is dipped and substantially immersed into a bath of the washcoat with the outlet end of the permeation side first. In this process the inlet end of the permeation side may be unplugged during coating.

The invention provides furthermore a catalysed particulate filter prepared in accordance with anyone of the above described embodiments according to the invention.

Examples of suitable filter materials for use in the invention are silicon carbide, aluminium titanate, cordierite, alumina, mullite or combinations thereof.

The amount of the first catalyst on the filter is typically 20 to 180 g/l and the amount of the combined second and third catalyst compositions on the filter is typically 10 to 80 g/l. The total catalyst loading on the filter is typically in the range of 40 to 200 g/l.

The advantage of thus prepared filter is a lowered pressure drop and an improved fuel economy compared to the known exhaust gas cleaning systems with separate filter and catalyst units.

EXAMPLE

A conventional high porosity plugged SiC wall flow filter body with a porosity of approximately 60% and wall mean pore size of about 18 μm is applied.

A suspension of a first catalyst is made by mixing and dispersing 100 g of silica aluminium phosphate SAPO-34 promoted with 2% copper in 200 ml demineralised water pr liter filter. A dispersing agent Zephrym PD-7000 and an antifoam agent are added. The suspension is milled in a bead mill. The average particle size of the suspension is between 5 and 10 μm and less than the mean pore diameter of the pores in the wall of the wall flow filter.

A suspension of the second catalyst composition is in a first step prepared from a mixture of platinum palladium (molar ratio 3:1) deposited on alumina particles of an average particle size larger than the filter wall mean pore size. A suspension of the mixture is prepared by mixing 20 g of this powder in 40 ml demineralised water pr liter filter. In a second step a suspension of the third catalyst composition is prepared from a beta zeolite powder with 1.0% copper with a mode particle size larger than the filter wall mean pore size. The suspension is prepared by mixing and dispersing 20 g of the copper beta zeolite powder in 40 ml demineralised water per liter filter. A dispersing agent Zephrym PD-7000 and an antifoam agent are added. The suspensions from the two steps are then mixed and further dispersed. The mode particle sizes of the final suspension is larger than the mean pore diameter of the pores in the wall of the wall flow filter A suspension of the combined second catalyst and third catalyst composition is then mixed into the suspension of the first SCR catalyst composition, whereby the final washcoating catalyst suspension is obtained.

The final catalyst suspension is washcoated on the filter from the outlet end of the filters permeate side by standard washcoat methods. The coated filter is then dried and calcined at 750° C.

The invention claimed is:

1. Method for the preparation of a catalysed particulate filter comprising the steps of:
    a) providing a porous filter body having a dispersion side and a permeation side;
    b) providing a catalyst washcoat containing particles of a first catalyst composition being active in selective catalytic reduction of nitrogen oxides together with particles of second catalyst composition being active in oxidation of carbon monoxide and hydrocarbons and ammonia and particles of a third catalyst composition being active in selective oxidation of ammonia to nitrogen in combination with the second catalyst composition, wherein the particles of the first catalyst composition have a mode particle size less than mean pore size of the particulate filter, and wherein the particles of the second and third catalyst composition have a mode particle size larger than mean pore size of the particulate filter;
    c) coating the filter body with the catalyst washcoat by introduction of the washcoat into outlet end of the permeation side; and
    d) drying and heat treating the coated filter body to obtain the catalysed particulate filter, wherein the first catalyst composition comprises at least one of an iron and/or copper promoted zeolite, a silica aluminum phosphate, an ion exchanged zeolite or a silica aluminum phosphate, one or more base metal oxides and a catalyst support of at least one of cerium oxide mixed with tungsten oxide on a titania support, an alumina support, a zirconia support or a silica support and mixtures thereof.

2. The method of claim 1, wherein the zeolite is beta zeolite or a chabazite zeolite.

3. The method of claim 1, wherein the silica alumina phosphate with chabazite structure is SAPO 34 catalyst promoted with copper.

4. The method of claim 1, wherein the second catalyst composition comprises a mixture of platinum and palladium supported on at least one of alumina, titania, ceria, silica and zirconia support.

5. The method of claim 1, wherein the third catalyst composition comprises a copper and/or iron promoted zeolite or a copper and/or iron promoted silica alumina phosphate with chabazite structure.

6. The method of claim 5, wherein the zeolite is a beta zeolite or zeolite with chabazite structure.

7. The method according to claim 1, wherein the filter is in form of a wall flow monolith with a plurality of longitudinal passages divided by longitudinal porous walls, dispersion side of the passages having an open inlet end and plugged outlet end, and permeation side of the passages having a plugged inlet end and an open outlet end.

8. The method according to claim 1, wherein the washcoat is introduced from the outlet end of the permeation side.

9. The method according to claim 1, wherein the washcoat is applied prior to plugging the inlet end of the permeation side.

* * * * *